(12) United States Patent
Koenigbauer et al.

(10) Patent No.: US 10,718,643 B2
(45) Date of Patent: Jul. 21, 2020

(54) HAND-HELD POWER TOOL

(71) Applicant: Hilti Aktiengesellschaft, Schaan (LI)

(72) Inventors: Egon Koenigbauer, Eichenau (DE); Hans Appel, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 218 days.

(21) Appl. No.: 15/745,391

(22) PCT Filed: Jul. 12, 2016

(86) PCT No.: PCT/EP2016/066508
§ 371 (c)(1),
(2) Date: Jan. 16, 2018

(87) PCT Pub. No.: WO2017/012918
PCT Pub. Date: Jan. 26, 2017

(65) Prior Publication Data
US 2019/0101422 A1    Apr. 4, 2019

(30) Foreign Application Priority Data

Jul. 17, 2015 (EP) ..................... 15177210

(51) Int. Cl.
*G01F 1/56* (2006.01)
*B23Q 11/00* (2006.01)
*B25D 11/00* (2006.01)

(52) U.S. Cl.
CPC ............ *G01F 1/56* (2013.01); *B23Q 11/0046* (2013.01); *B23Q 11/0071* (2013.01); *B25D 11/00* (2013.01)

(58) Field of Classification Search
CPC ... G01F 1/56; B23Q 11/0071; B23Q 11/0046; B25D 11/00
See application file for complete search history.

(56) References Cited

U.S. PATENT DOCUMENTS

| 4,594,901 A | 6/1986 | Norman |
| 9,067,292 B2 | 6/2015 | Appel |
| 9,585,533 B2 | 3/2017 | Hensel et al. |
| 2002/0141836 A1 | 10/2002 | Ege et al. |

(Continued)

FOREIGN PATENT DOCUMENTS

| CN | 2346548 Y | 11/1999 |
| CN | 202271449 U | 6/2012 |

(Continued)

OTHER PUBLICATIONS

PCT/EP2016/066508, International Search Report (PCT/ISA/220 and PCT/ISA/210) dated Oct. 14, 2016, with partial English translation (Seven (7) pages).

*Primary Examiner* — Peter J Macchiarolo
*Assistant Examiner* — John M Royston
(74) *Attorney, Agent, or Firm* — Crowell & Moring LLP

(57) ABSTRACT

A suction module for a hand-held power tool includes a motor-driven fan wheel, an intake channel for sucking in dust-laden air, and a collecting container for dust. A flow sensor has a sensor surface, which is formed of plastic and is arranged in the intake channel, an electric field meter facing the sensor surface for determining the electrostatic field strength on the sensor surface, and an evaluating unit for determining a flow rate of dust-laden air on the basis of the determined electrostatic field strength.

4 Claims, 1 Drawing Sheet

(56) References Cited

U.S. PATENT DOCUMENTS

| | | | | |
|---|---|---|---|---|
| 2004/0197953 | A1* | 10/2004 | Funk | B81C 1/00333 |
| | | | | 438/108 |
| 2005/0005711 | A1* | 1/2005 | Gysling | G01F 1/363 |
| | | | | 73/861.08 |
| 2012/0042715 | A1* | 2/2012 | Liu | G01F 1/00 |
| | | | | 73/54.01 |
| 2013/0136549 | A1* | 5/2013 | Appel | B23Q 11/0046 |
| | | | | 408/56 |
| 2013/0149056 | A1 | 6/2013 | Appel | |
| 2016/0265953 | A1* | 9/2016 | Wittmer | G01N 27/4166 |

FOREIGN PATENT DOCUMENTS

| | | |
|---|---|---|
| CN | 103128337 A | 6/2013 |
| CN | 103369995 A | 10/2013 |
| EP | 1 245 330 A2 | 10/2002 |
| EP | 2 599 584 A1 | 6/2013 |
| FR | 2 851 819 A1 | 9/2004 |
| GB | 2 166 874 A | 5/1986 |
| JP | 60-14153 A | 1/1985 |

\* cited by examiner

HAND-HELD POWER TOOL

This application claims the priority of International Application No. PCT/EP2016/066508, filed Jul. 12, 2016, and European Patent Document No. 15177210.0, filed Jul. 17, 2015, the disclosures of which are expressly incorporated by reference herein.

BACKGROUND AND SUMMARY OF THE INVENTION

The present invention relates to a suction module for a hand-held power tool.

A suction module is known from EP 2599584 A1. The suction module has a collecting container for dust and a motor-driven fan wheel, which carries dust-laden air from an intake nozzle to the collecting container. The suction module covers both the drill bit as well as the drill hole, as a result of which it is difficult for a user to detect interruptions in the drilling operation.

The suction module according to the invention for a hand-held power tool has a motor-driven fan wheel, an intake channel for drawing in dust-laden air and a collecting container for dust. A flow sensor has a sensor surface formed of plastic, which is arranged in the intake channel; an electric field meter, which faces the sensor surface, for determining the electrostatic field strength at the sensor surface; and an evaluation unit for determining a flow rate of dust-laden air on the basis of the determined electrostatic field strength. During proper drilling operations, a minimum quantity of dust-laden air per unit of time is accrued. If the effective flow rate is less, this points to a possible problem. When taking into account the flow rate or its changes, a malfunction can be prevented by the user, the suction module, or the hand-held power tool.

The following description explains the invention using illustrative embodiments and drawing.

DETAILED DESCRIPTION OF THE DRAWING

Figure 1:
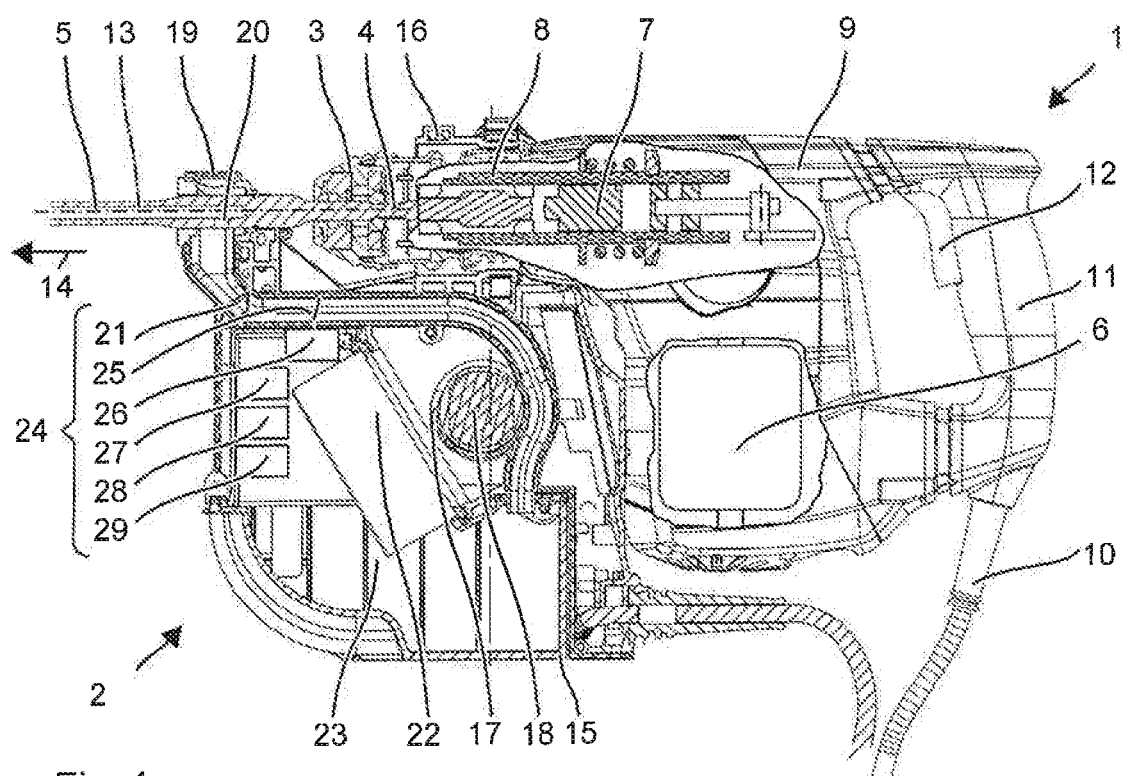
FIG. 1 illustrates a hammer drill with a suction module.

FIG. 1 depicts a hammer drill 1 with a mounted suction module 2. Hammer drill 1 has a tool holder 3, in which a shaft end 4 of a tool, e.g., hollow drill hit 5, can be inserted. A primary drive of hammer drill 1 is formed by a motor 6, which drives a pneumatic striking mechanism 7 and a drive shaft 8. Motor 6, pneumatic striking mechanism 7, and drive shaft 8 are arranged in a machine housing 9. A battery pack or a power cable 10 supplies motor 6 with electricity. A user can guide hammer drill 1 by means of a handgrip 11 and place hammer drill 1 into operation by means of a system switch 12. When in operation, hammer drill 1 continually rotates drill bit 5 about a working axis 13 and can thereby strike drill bit 5 into a substrate in strike direction 14 along working axis 13.

Suction module 2 aspirates the drill cuttings created by hollow drill bit 5. Instead of having a transport spiral for carrying the drill cuttings out of a drill hole, hollow drill bit 5 has a hollow shaft, through which the drill cuttings are aspirated by means of an airflow. The airflow is generated by suction module 2.

Suction module 2 has a module housing 15, which can be attached to machine housing 9 of hammer drill 1. For example, machine housing 9 has a sleeve 16, which can be pushed on over a neck near tool holder 3. The user can control suction module 2 together and indirectly by means of hammer drill 1. Suction module 2 has a fan wheel 17, which is driven by an electric motor 18. Fan wheel 17 aspirates an airflow. The airflow enters into suction module 2 at an intake nozzle 19. Intake nozzle 19 encloses in a ring-shaped manner an outlet opening 20 of hollow drill bit 5. An intake channel 21 directs the airflow from intake nozzle 19 to a dust filter 22 and a collecting container 23. The dust in the air is separated at dust filter 22 and falls into collecting container 23. Fan wheel 17 is preferably located downstream from dust filter 22, so that fan wheel 17 comes into contact only with dust-free air or at least air with a low dust-level. Downstream from fan wheel 17, suction module 2 has a discharge opening.

In the event of a large quantity of drill cuttings, hollow drill bit 5 can get clogged. Suction module 2 warns the user when clogging has occurred or clogging is expected. An indication of hollow drill bit 5 being clogged is for example a rapid drop of dust content in the airflow. When a hollow drill bit 5 is not clogged, suction module 2 aspirates a dust-laden airflow from hollow drill bit 5 and also a dust-free airflow from the environment. The ratio of the airflows can be configured by the seal of hollow drill bit 5 in intake nozzle 19. When hollow drill bit 5 gets clogged, the dust-laden airflow decreases while the dust-free airflow is not influenced or even becomes greater.

Suction module 2 has a flow sensor 24 for determining the dust quantity in the airflow. Flow sensor 24 has a sensor surface 25 of plastic. Sensor surface 25 can be formed for example by interior side 20 of intake channel 21. Alternatively, a pad of plastic can be arranged in intake channel 21. The pad is preferably arranged in line with the airflow so that the dust particles can flow along the length of the pad. Sensor surface 25 may be of the same plastic as the rest of the intake channel; however, sensor surface 25 preferably consists of a different plastic, such as polyethylene or polytetrafluoroethylene.

Flow sensor 24 has an electric field meter 26. Electric field meter 26 measures the (field) strength of the electrostatic field at sensor surface 25. An illustrative implementation of an electric field meter 26 comprises a micromechanical spring, which is electrically charged in relation to a reference plate. The deflection of the spring in relation to the reference plate is a measure of the electric fields in the environment; the electrostatic field of sensor surface 25 increases or decreases the deflection, depending on the polarity and orientation of electric field meter 26. Other construction methods for electric field meters are known and can also be used. Electric field meter 26 is arranged facing sensor surface 25, preferably in close proximity to it. Electric field meter 26 can be arranged within intake channel 21 or outside of intake channel 21.

An evaluation unit 27 of flow sensor 24 evaluates the measured field strength. The electrostatic field is generated by a triboelectric effect. The dust grains are ionized by the friction on the sensor surface and thereby charge sensor surface 25. The preferred plastics polyethylene and polytetrafluoroethylene prove themselves to be highly ionizing. Air humidity and leakage currents of other causes discharge sensor surface 25. If there is a sufficiently dust-laden airflow, the charging of sensor surface 25 and the charge-based electrostatic field of electric field meter 26 can be determined.

Based en the measured field strength, evaluation unit 27 determines the flow rate of dust in the airflow, A corresponding measurement signal can be emitted by evaluation unit 27 to a display 28, which indicates the dust content to the user. For example, the display can indicate the flow rate as a representative number or symbolically using a bar display.

Evaluation unit 27 can also trigger a warning device 29. Warning device 29 continually monitors the flow rate and determines a rate of change for the dust content over time. If the flow rate decreases faster than a first rate of change, a warning signal is emitted. The first rate of change describes the decrease of the flow rate when hollow drill bit 5 is clogged. The first rate of change is determined in tests and is stored in a memory in warning device 29. Warning device 29 can indicate the clogging of hollow drill bit 5 in a visual or acoustic manner, and/or cause hammer drill 1 to cease drilling.

Evaluation unit 27 may have stored in it a second rate of change, which is greater, in terms of quantity, than the first rate of change. The second rate of change describes the extraction of hollow drill bit 5 out of the drill hole. Hollow drill bit 5 does not create any additional drill cuttings, which is why the dust content decreases. Since suction module 2 can aspirate more air compared to clogged hollow drill bit 5, the dust content in the air decreases more quickly.

The invention claimed is:

1. A suction module for a hand-held power tool, comprising:
   a motor-driven fan wheel; and
   an intake channel, wherein dust-laden air is drawn through the intake channel by the motor-driven fan wheel; and
   a flow sensor, wherein the flow sensor includes:
      a sensor surface which is formed of plastic and is disposed in the intake channel;
      an electric field meter which faces the sensor surface, wherein an electrostatic field strength at the sensor surface is determined by the electric field meter; and
      an evaluation unit, wherein a flow rate of dust-laden air in the intake channel based on the determined electrostatic field strength is determined by the evaluation unit.

2. The suction module according to claim 1, wherein the flow sensor further includes a warning device and wherein the warning device, in an event of a flow rate decrease, emits a warning signal when the flow rate decrease occurs with a rate of change that is greater than a specified rate of change.

3. The suction module according to claim 1, wherein the flow sensor further includes a display and wherein the display displays the flow rate.

4. A control method performed by a suction module, wherein the suction module includes:
   a motor-driven fan wheel; and
   an intake channel, wherein dust-laden air is drawn through the intake channel by the motor-driven fan wheel; and
   a flow sensor, wherein the flow sensor includes:
      a sensor surface which is formed of plastic and is disposed in the intake channel;
      an electric field meter which faces the sensor surface; and
      an evaluation unit,
   comprising the steps of:
   determining a field strength of an electrostatic field at the sensor surface by the electric field meter;
   calculating a flow rate of dust-laden air in the intake channel based on the determined field strength by the evaluation unit; and
   emitting a warning signal on a display when the flow rate decreases faster than a specified rate of change.

\* \* \* \* \*